United States Patent
Haas et al.

(10) Patent No.: US 6,759,363 B2
(45) Date of Patent: Jul. 6, 2004

(54) ACTIVATORS FOR THE PRODUCTION OF POLYURETHANE FOAMS

(75) Inventors: Peter Haas, Haan (DE); Dirk Wegener, Monheim (DE); Hartwig Grammes, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 263 days.

(21) Appl. No.: 10/005,832

(22) Filed: Nov. 9, 2001

(65) Prior Publication Data

US 2002/0123597 A1 Sep. 5, 2002

(30) Foreign Application Priority Data

Nov. 14, 2000 (DE) .......................................... 100 56 309

(51) Int. Cl.[7] ................................................ B01J 31/00
(52) U.S. Cl. ....................... 502/167; 521/129; 521/137; 521/163; 521/170; 521/174; 528/49; 528/53
(58) Field of Search .......................... 502/167; 521/137, 521/163, 129, 170, 174; 528/49, 53

(56) References Cited

U.S. PATENT DOCUMENTS

| 4,169,921 A | 10/1979 | Moss et al. |
| 4,644,017 A | 2/1987 | Haas et al. |
| 6,136,878 A | * 10/2000 | Free et al. .................. 521/137 |

FOREIGN PATENT DOCUMENTS

| DE | 30 27 796 | 2/1982 |
| DE | 195 12 479 | 10/1996 |
| DE | 195 31 955 | 3/1997 |

* cited by examiner

*Primary Examiner*—John M. Cooney, Jr.
(74) *Attorney, Agent, or Firm*—Joseph C. Gil; Lyndanne M. Whalen

(57) ABSTRACT

Activators with reduced volatility that are liquid at room temperature are obtained as the reaction product of (A) a secondary amine or primary alcohol having at least one tertiary amine group, (B) a polyisocyanate of the diphenylmethane series having a functionality of from 2.5 to 4.0 and an OH-functional reactive component capable of addition to isocyanate. These activators are useful for the production of polyurethane foams having improved emission behavior.

7 Claims, No Drawings

ACTIVATORS FOR THE PRODUCTION OF POLYURETHANE FOAMS

BACKGROUND OF THE INVENTION

The present invention relates to activators having reduced volatility that are liquid at room temperature, which activators make it possible to produce polyurethane foams having improved emission behavior.

In the production of cellular or compact polyurethanes, organometallic compounds and tertiary amines are primarily used as catalysts. A disadvantage of tertiary amines is their volatility. Various methods for reducing the volatility of tertiary amines have been proposed. When higher molecular weight compounds are used, the price paid for lower volatility is lower activity, which must be compensated for by the addition of an increased amount of catalyst.

EP-A 176 013 teaches use of aminoalkylureas as activators. These compounds already have reduced volatility and cause less contact discoloration of covering and lining materials adjacent to the polyurethane. However, their production requires long reaction times and their emission behavior does not yet meet the high demands of the automotive industry.

DE-OS 30 27 796 describes dialkylaminoalkylureas as activators for the production of polyurethane foams. These activators are prepared by reaction of secondary amines with diisocyanates in organic solvents and are obtained, after concentration, in the form of highly viscous to crystalline products. They must then be converted into a form suitable for use in the production of polyurethanes, since they cannot readily be processed in the form of the pure product. Such a conversion is complex and expensive.

SUMMARY OF THE INVENTION

It has now been found that particular urea derivatives and urethane derivatives, which can be obtained by reaction of specific amines with higher-functional polyisocyanates and isocyanate-reactive compounds, possess excellent solubility properties and exhibit low volatility and high activity in polyurethane foam-forming systems. Use of these activators results in extremely low emissions, even when subjected to heat, and does not damage other materials adjacent to the polyurethane. These advantages are important in connection with the problem of fogging (i.e., emissions in the interior of a motor vehicle), especially under the effect of heat, which can impair adjacent materials and can be detected in the air inside the motor vehicle.

DETAILED DESCRIPTION OF THE PREFERRED EMBODIMENTS OF THE INVENTION

The present invention relates to an activator useful for the production of polyurethane foams and to a process for the production of polyurethane foams in which this activator is employed. The activator of the present invention is a reaction product of A) a secondary amine or primary alcohol having at least one tertiary amino group, B) a polyisocyanate of the diphenylmethane series having a functionality of from 2.5 to 4.0, preferably from 2.5 to 3.5, and C) an OH-functional reactive component capable of addition to isocyanate, preferably having a number-average molecular weight of from 62 to 750.

The reaction is preferably carried out with stoichiometric amounts of isocyanate B) and the secondary amine or primary alcohol having at least one tertiary amino group A). That is, one amino group or hydroxyl group of the secondary amine or primary alcohol having at least one tertiary amino group A) is present in the reaction mixture for each NCO group of the isocyanate B). The activator-forming reaction is preferably carried out in a manner such that the solvent component C) and component A) are placed in a vessel and the isocyanate B) is added at a temperature of from 20 to 50° C. When the addition of the isocyanate B) is complete, the reaction is carried out until no free NCO groups are present in the reaction mixture. This reaction is generally carried out at temperatures of from 20 to 100° C., preferably at from 40 to 60° C., most preferably at approximately 50° C., because at these temperatures, the solvent C) reacts with the isocyanate B) to only a minor extent.

The polyurethane foams of the present invention are generally produced by reacting a) a polyisocyanate or polyisocyanate prepolymer, b) at least one component that is reactive towards isocyanate groups and has a functionality of from 2 to 6 and a number-average molecular weight of from 1000 to 15,000, c) optionally, a chain-lengthening agent having a molecular weight of from 62 to 999, d) an activator according to the present invention, e) water, f) optionally, liquid $CO_2$ or an organic blowing agent, g) optionally, a stabilizer, and h) optionally, further additives.

In a preferred embodiment of the invention, the polyurethane is bonded to or manufactured with another material. For example, the polyurethane may be coated with a film or the polyurethane may be produced by applying foam-forming mixture to the back of a film or by spraying the back of a film with the polyurethane-forming mixture.

Other materials to which the polyurethane may be applied or with which the polyurethane may be manufactured preferably include PVC, ABS, mixtures of PVC, ABS, polyvinyl acetate, polyvinylbutyral, homo- or co-polymers based on vinyl chloride, styrene, butadiene, isoprene, chloroprene, dichlorobutadiene, ethylene, propene and acrylonitrile in the form of films, coatings and edgings of various colors, lacquers based on cellulose esters, polyester resins, epoxy resins, alkyd resins, as well as oil lacquers or lacquers of a combination of these components, and textiles based on cotton or leather. In a particularly preferred embodiment, polyolefins are used as the material with which the polyurethane is manufactured.

Suitable isocyanates useful for producing polyurethanes in accordance with the present invention include organic diisocyanates, polyisocyanates and polyisocyanate prepolymers. Suitable diisocyanates and polyisocyanates include aliphatic, cycloaliphatic, araliphatic, aromatic and heterocyclic polyisocyanates, such as those described in Justus Liebigs *Annalen der Chemie* Volume 562, page 75 (1949). Examples of such isocyanates are those represented by the formula

in which n represents an integer from 2 to 4, preferably 2, and

Q represents an aliphatic hydrocarbon radical having from 2 to 18 (preferably from 6 to 10) carbon atoms, a cycloaliphatic hydrocarbon radical having from 4 to 15 (preferably from 5 to 10) carbon atoms, an aromatic hydrocarbon radical having from 6 to 15 (preferably from 6 to 13) carbon atoms, or an araliphatic hydrocarbon radical having from 8 to 15 (preferably from 8 to 13) carbon atoms.

Polyisocyanates such as those described in DE-OS 28 32 253 are preferred. It is particularly preferred to use readily available polyisocyanates such as 2,4- and 2,6-toluene diisocyanate as well as any desired mixtures of those isomers ("TDI"), polyphenyl-polymethylene polyisocyanates, such as those prepared by aniline-formaldehyde condensation and subsequent phosgenation ("crude MDI"), and polyisocyanates containing carbodiimide groups, urethane groups, allophanate groups, isocyanurate groups, urea groups or biuret groups ("modified polyisocyanates"), especially those modified polyisocyanates which are derived from 2,4- and/or 2,6-toluene diisocyanate or from 4,4'-and/or 2,4'-diphenylmethane diisocyanate. It is also possible to use prepolymers of these isocyanates and organic compounds having at least one hydroxyl group. Examples of suitable hydroxyl group-containing compound are polyols or polyesters having from one to four hydroxyl groups and number-average molecular weights of from 60 to 1400.

Polyisocyanates that are available under the name "polymeric diphenylmethane diisocyanate" and have a functionality greater than 2.0, mixtures thereof with diphenylmethane diisocyanate or ternary mixtures of polymeric diphenylmethane diisocyanate, diphenylmethane diisocyanate and toluene diisocyanate, as well as prepolymers prepared from the mentioned isocyanates are most preferred.

The isocyanate-reactive component contains at least one component that is reactive towards isocyanate groups and generally has a functionality of from 2 to 6 and a number-average molecular weight of from 1000 to 15,000. Such a component may be, for example, a polyether polyol such as a poly(oxyalkylene) polyol or a polyester polyol or a combination thereof.

Poly(oxyalkylene) polyols that may be used in the practice of the present invention may be prepared, for example, by polyaddition of an alkylene oxide to a polyfunctional starter compound in the presence of a basic catalyst. Preferred starter compounds are molecules having from two to six hydroxyl groups per molecule, such as water, triethanolamine, 1,2-ethanediol, 1,2-propanediol, 1,3-propanediol, diethylene glycol, dipropylene glycol, triethylene glycol, tripropylene glycol, 1,2-butanediol, 1,3-butanediol, 1,4-butanediol, 1,2-hexanediol, 1,3-hexanediol, 1,4-hexanediol, 1,5-hexanediol, 1,6-hexanediol, glycerol, trimethylolpropane, pentaerythritol, and sorbitol. Other possible starter compounds are ammonia and compounds having at least one primary or secondary amino group, such as aliphatic amines (e.g., 1,2-diaminoethane), an oligomer of 1,2-diaminoethane (for example, diethylenetriamine, triethylenetetramine or pentaethylenehexamine), ethanolamine, diethanolamine, 1,3-diaminopropane, 1,3-diaminobutane, 1,4-diaminobutane, 1,2-diaminohexane, 1,3-diaminohexane, 1,4-diaminohexane, 1,5-diaminohexane, 1,6-diaminohexane, aromatic amines such as 1,2-diaminobenzene, 1,3-diaminobenzene, 1,4-diaminobenzene, 2,3-diaminotoluene, 2,4-diaminotoluene, 3,4-diaminotoluene, 2,5-diaminotoluene, 2,6-diaminotoluene, 2,2'-diaminodiphenylmethane, 2,4'-diaminodiphenylmethane, 4,4'-diaminodiphenylmethane, and aromatic amines that are obtained by acid-catalyzed condensation of aniline with formaldehyde. The starter compounds may be used alone or in a mixture.

Alkylene oxides that are preferably used for the preparation of the poly(oxyalkylene) polyols are oxirane, methyloxirane and ethyloxirane. They may be used alone or in a mixture. When used in a mixture, it is possible to react the alkylene oxides randomly or block-wise or both in succession. Further details may be found in Ullmanns *Encyclopädie der Industriellen Chemie*, Volume A21, p. 670 f (1992).

A suitable poly(oxyalkylene) polyol may also be a dispersion of a graft polymerization product in a poly(oxyalkylene) polyol. That polymerization product may be prepared, for example, by radical in situ polymerization of acrylonitrile and/or styrene in a poly(oxyalkylene) polyol. (See, for example, U.S. Pat. No. 3,523,093.) Other suitable polymerization products are, for example, polyurea compounds, polyhydrazides, and polyurethanes containing tertiary amino groups. Suitable methods for the preparation of dispersions of such polymerization products are described, for example, in EP-A 11 752, U.S. Pat. No. 4,374,209 and DE-OS 32 31 497. The proportion of polymerization products in the dispersion is preferably from 1 to 50 wt. %.

It is also possible to use one or more polyester polyols having number-average molecular weights of from 1000 to 30,000 g/mol., preferably, from 1000 to 10,000 g/mol., most preferably, from 2000 to 6000 g/mol., produced from an aromatic and/or aliphatic dicarboxylic acid and a polyol having at least two hydroxyl groups to produce polyurethanes in accordance with the present invention. Examples of suitable dicarboxylic acids are phthalic acid, isophthalic acid, terephthalic acid, fumaric acid, maleic acid, azelaic acid, glutaric acid, adipic acid, suberic acid, sebacic acid, malonic acid and succinic acid. The pure dicarboxylic acid as well as any desired mixtures thereof may be used. Instead of the free dicarboxylic acids, the corresponding dicarboxylic acid derivatives, such as, for example, dicarboxylic acid mono- or di-esters of alcohols having from one to four carbon atoms, may also be used. Such esters are formed, for example, in the recycling of polyester waste. It is also possible to use as the acid component dicarboxylic acid anhydrides, such as phthalic anhydride or maleic anhydride. Preferably used as the alcohol component for the esterification are: ethylene glycol, diethylene glycol, tetraethylene glycol, 1,2-propanediol, 1,3-propanediol, 1,4-butanediol, 1,5-pentanediol, 1,6-hexanediol, 1,10-decanediol, glycerol, trimethylolpropane, pentaerythritol, or a mixture thereof. It is also possible to use a polyester polyol of a lactone (for example, $\epsilon$-caprolactone) or of a hydroxycarboxylic acid (for example, a $\omega$-hydroxycarboxylic acid).

The isocyanate-reactive component used to produce polyurethanes in accordance with the present invention may also include a polyether ester polyol, such as any of those obtainable, for example, by reaction of phthalic anhydride with diethylene glycol and subsequent reaction with oxirane.

Further examples of suitable polyols which may be present in the isocyanate-reactive component are polyfunctional alcohols or amines or amino alcohols or mixtures thereof as well as their propoxylated and/or ethoxylated secondary products, and polyester polyols that are obtained by esterification of polyfunctional alcohols with polyfunctional carboxylic acids. The isocyanate-reactive component preferably has a primary hydroxyl group content of at least 75%.

In addition to the isocyanate and isocyanate-reactive components, chain-lengthening agents or crosslinking agents having a molecular weight of from 62 to 999 g/mol. may optionally be included in the polyurethane-forming reaction mixture. Examples of suitable chain-lengthening and crosslinking agents include: glycerol, glycols, sorbitol, alkanolamines and the alkoxylation products thereof. It is possible to use both aromatic and aliphatic lengthening agents. In addition to hydroxy-functional chain-lengthening agents or crosslinking agents, amino-functional chain-lengthening agents or crosslinking agents may also be used.

In accordance with the present invention, an activator is included in the polyurethane-forming reaction mixture. Suitable activators are reaction products of
- A) a secondary amine or primary alcohol having at least one tertiary amino group,
- B) a polyisocyanate of the diphenylmethane series having a functionality of from 2.5 to 4.0, preferably from 2.5 to 3.5, and
- C) as solvent, an OH-functional reactive component capable of addition to isocyanate.

Component A) is preferably a bis(dialkylaminoalkyl)-amine or an N-hydroxyalkyl bis(tert.-aminoalkyl) ether. Special preference is given to compounds of the general formula

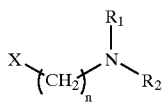

wherein X=

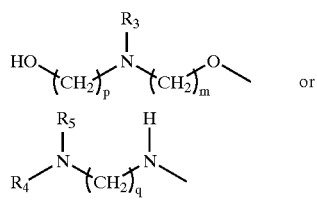

in which
n, m, p, q represent integers from 2 to 5, and may be identical or different, and
$R_1$, $R_2$, $R_3$, $R_4$, $R_5$ each represents a $C_1$–$C_5$-alkyl group, preferably methyl.

The use of bis(3-(N,N-dimethylamino)propyl)amine or 2-hydroxy-ethyl-trimethyl-diaminodiethyl ether as component A) is particularly preferred.

Component B) is preferably a polyisocyanate of the diphenyl-methane series having a polynuclear proportion of at least 20%.

Component C) acts as solvent for the addition products formed by reaction of components A) and B). It is usually used in amounts such that the concentration of the addition products of A) and B) in component C) is from 20 to 60 wt. %.

Examples of compounds that may be used as component C) are dipropylene glycol, tripropylene glycol, triisopropanolamine, and addition products of propylene oxide and triethanolamine.

The activator is usually used in an amount of from 0.1 to 10 parts by weight, preferably from 1 to 5 parts by weight, based on 100 parts by weight of the total weight of the isocyanate-reactive component and any chain-lengthening or crosslinking agent employed.

Water is used as a chemical blowing agent in an amount of from 0.5 to 7.0 wt. %, preferably from 1.0 to 4.0 wt. %, based on the total weight of isocyanate-reactive component and any chain-lengthening or cross-linking agent employed.

The polyurethane-forming reaction mixture may additionally contain liquid $CO_2$ or one or more organic blowing agents as physical blowing agents. Examples of suitable physical blowing agents include: hydro-carbons, such as cyclopentane, isopentane, and n-pentane; halogenated hydrocarbons, such as dichloromethane, dichloromonofluoromethane, difluoromethane, trifluoromethane, difluoroethane, 1,1,1,2-tetrafluoroethane, tetrafluoroethane (R 134 or R 134a), 1,1,1,4,4,4-hexafluorobutane (R 356), 1,1,1,3,3-pentafluoropropane (R 245fa), 1,1,1,3,3-pentafluorobutane (R 365mfc), chlorodifluoroethanes, 1,1-dichloro-2,2,2-trifluoroethane, 2,2-dichloro-2-fluoroethane, heptafluoropropane and sulfur hexafluoride. Mixtures of those blowing agents may also be used. Other suitable blowing agents are carboxylic acids, such as formic acid, acetic acid, oxalic acid, and chemical blowing agents that liberate gases in the course of the foaming process, such as, for example, azo compounds. Such blowing agents are preferably used in combination with water.

Stabilizers which are especially useful include polyether siloxanes, particularly, water-soluble polyether siloxanes. The structure of those compounds is generally such that a copolymer of ethylene oxide and propylene oxide is bonded to a polydimethylsiloxane radical. Such stabilizers are described, for example, in U.S. Pat. Nos. 2,834,748; 2,917,480 and 3,629,308. Of particular interest are polysiloxane-polyoxyalkylene copolymers such as those disclosed in DE-OS 25 58 523 that are branched a plurality of times via allophanate groups.

In the production of the polyurethane foams in accordance with the present invention, additional auxiliary substances and additives may optionally be added to the polyurethane-forming reaction mixture. Examples are flameproofing agents such as, for example, tricresyl phosphate, tris-(2-chloroethyl) phosphate, tris-(2-chloropropyl) phosphate, tris-(2,3-dibromopropyl) phosphate, tetrakis-(2-chloroethyl) ethylene diphosphate, dimethylmethane phosphonate, diethanolaminomethyl-phosphonic acid diethyl ester, as well as halogen-containing polyols having a flameproofing action. It is also possible to use paraffins or fatty alcohols or dimethylpolysiloxanes, pigments or coloring agents, stabilizers against the effects of ageing and weathering, plasticizers such as dioctyl phthalate, substances having a fungistatic and bacteriostatic action, as well as fillers such as barium sulfate, kieselguhr, carbon black or prepared chalk. These substances are usually added to the isocyanate-reactive component in amounts of from 0 to 10 parts by weight, preferably from 0 to 5 parts by weight.

Further examples of surface-active additives and foam stabilizers that may optionally be used, as well as cell regulators, retarding agents, stabilizers, flame-retardant substances, coloring agents and fillers, substances having a fungistatic and bacteriostatic action, and details regarding the use and the action of such additives, are described in G. Oertel (eds.): *Kunststoff-Handbuch*, Volume VII, Carl Hanser Verlag, 3rd edition, Munich 1993, p. 110–115.

Having thus described our invention, the following Examples are given as being illustrative thereof. All parts and percentages given in these Examples are parts by weight and percentages by weight, unless otherwise indicated.

EXAMPLES

Description of the Starting Materials

Polyol 1

Polyether polyol having an OH number of 28 and at least 80% primary OH groups, prepared by addition of propylene oxide/ethylene oxide (83/17) to trimethylolpropane as starter.

Polyol 2

Polyether polyol having an OH number of 28 and at least 80% primary OH groups, prepared by addition of propylene oxide/ethylene oxide (83/17) to trimethylolpropane as starter and having a grafted filler content of 20 wt. % of styrene/acrylonitrile (40/60%).

Polyol 3

Polyether polyol having an OH number of 500, prepared by addition of propylene oxide to triethanolamine as starter.

Polyisocyanate 1

Polyisocyanate of the diphenylmethane series that has been obtained by phosgenation of an aniline/formaldehyde condensation product, having a content of 45 wt. % diphenylmethane diisocyanate and 55 wt. % higher homologs, that has an isocyanate content of 31.5 wt. % and a functionality >2.5.

Polyisocyanate 2

Polyisocyanate of the diphenylmethane series that has been obtained by phosgenation of an aniline/formaldehyde condensation product, having a content of 35 wt. % diphenylmethane diisocyanate and 65 wt. % higher homologs, that has an isocyanate content of 31.5 wt. % and a functionality >2.7.

Polyisocyanate 3

Polyisocyanate of the diphenylmethane series that has been obtained by phosgenation of an aniline/formaldehyde condensation product, having a content of 30 wt. % diphenylmethane diisocyanate and 70 wt. % higher homologs, that has an isocyanate content of 31.5 wt. % and a functionality >2.8.

Polyisocyanate 4

Diisocyanatodiphenylmethane, containing 55% 2,4'-isomer and 45% 4,4'-isomer.

Polyisocyanate 5

Polyisocyanate of the diphenylmethane series that has been obtained by phosgenation of an aniline/formaldehyde condensation product, having a content of 90 wt. % diphenylmethane diisocyanate and 10 wt. % higher homologs, that has an isocyanate content of 31.5 wt. % and a functionality of 2.15.

Preparation of the Activators

Example 1

93.5 g of bis(3-(N,N-dimethylamino)propyl)amine and 295 g of Polyol 3 were placed in a vessel, and 65.6 g of Polyisocyanate 2 were added dropwise in the course of 5 minutes, with vigorous stirring, at room temperature, the temperature being maintained at 40° C. by cooling. Stirring was then continued for a further 30 minutes at 50° C. A product having an amine number of 240 mg KOH/g and a viscosity of 3390 mPa·s (25° C.) was obtained. The product was storage stable for more than 6 months.

Example 2

93.5 g of bis(3-(N,N-dimethylamino)propyl)amine and 295 g of Polyol 3 were placed in a vessel and reacted with 65.6 g of Polyisocyanate 3 analogously to Example 1. A product having an amine number of 240 mg KOH/g and a viscosity of 3730 mPa·s (25° C.) was obtained. The product was storage stable for more than 6 months.

Example 3

93.5 g of bis(3-(N,N-dimethylamino)propyl)amine and 295 g of dipropylene glycol were placed in a vessel and reacted with 65.6 g of Polyisocyanate 2 analogously to Example 1. A product having an amine number of 130 mg KOH/g and a viscosity of 842 mPa·s (25° C.) was obtained. The product was stable to storage for more than 6 months.

Example 4

Comparison 93.5 g of bis(3-(N,N-dimethylamino)propyl)amine and 295 g of Polyol 3 were placed in a vessel and reacted with 62.5 g of Polyisocyanate 4 analogously to Example 1. There was obtained a product having an amine number of 238 mg KOH/g, which slowly turned cloudy. The reaction product crystallized out within 4 weeks.

Example 5

Comparison 187 g of bis(3-(N,N-dimethylamino)propyl)amine and 542 g of Polyol 3 were placed in a vessel and reacted with 125 g of Polyisocyanate 5 analogously to Example 1. There was obtained a product having an amine number of 235 mg KOH/g, which showed cloudiness after 2 days. The reaction product crystallized out completely within 2 weeks.

Example 6

95 g of N-2-hydroxyethyl N,N',N'-trimethyldiaminodiethyl ether and 279 g of Polyol 3 were placed in a vessel and reacted with 66 g of Polyisocyanate 2 analogously to Example 1. A product having an amine number of 230 mg KOH/g and a viscosity of 2010 mPa·s (25° C.) was obtained. The product was storage stable for more than 6 months.

FOAMING EXAMPLES

Examples 7 to 10

Polyurethane foams were produced using the formulations indicated in TABLE 1. To that end, polyol, water and activator were pre-mixed, the isocyanate was then added, and the reaction mixture was homogenized for 10 seconds at 1200 rpm and then poured into a sheet mold to the base of which there had previously been fixed a commercially available PVC film having a size of 10 cm×10 cm and a thickness of approximately 1 mm.

TABLE 1

|  | Example | | | |
| --- | --- | --- | --- | --- |
|  | 7 | 8 | 9* | 10* |
| Polyol 1 (pbw) | 69.7 | 69.7 | 70.7 | 70.7 |
| Polyol 2 (pbw) | 22.0 | 22.0 | 23.0 | 23.0 |
| Polyol 3 (pbw) | 3.5 | 3.5 | 5.5 | 5.5 |
| Water (pbw) | 2.8 | 2.8 | 2.8 | 2.8 |
| Activator Example 1 (pbw) | 3.0 | — | — | — |
| Activator Example 2 (pbw) | — | 3.0 | — | — |
| Dimethylaminopropyl-urea (pbw) | — | — | 0.6 | — |
| Dabco 33 LV | — | — | — | 0.6 |
| Polyisocyanate 1 (pbw) | 50 | 50 | 50 | 50 |
| Start time [s] | 19 | 19 | 18 | 17 |
| Rising time [s] | 97 | 98 | 97 | 95 |
| Bulk density [kg/m$^3$] | 62 | 62 | 62 | 61 |

*comparison example not according to the invention
pbw = parts by weight

Aging Behavior of the Foams

The fogging behavior of the foams that had been produced was tested in accordance with DIN 75201/B. To determine temperature-dependent emissions, a dynamic process (DaimlerChrysler specification "PB VW T 709" for determining gaseous and condensable emissions from motor vehicle interior finishing materials with thermodesorption) as well as a static process (Audi/VW test specification "PV 3341" for non-metallic materials of motor vehicle interior finishing for determining the emission of organic compounds) were used.

In the case of the dynamic process for determining gaseous emissions (VOC value), the sample (weighed portion from 10 to 30 mg) was enclosed in an empty glass tube and heated for 30 minutes at 90° C. The volatile sample constituents emitted during the heating were separated by freezing at −150° C. and were then freed again by sudden heating to 280° C., separated on the capillary column of a gas chromatograph and detected using a mass-selective detector.

Following the determination of the gaseous emissions, the condensable emissions (FOG value) were detected using the same sample. To that end, the sample was left in the apparatus and heated for 60 minutes at 120° C. The volatile sample constituents emitted during the heating were, in turn, separated by freezing at −150° C. and then freed again by sudden heating to 280° C., separated on the capillary column of a gas chromatograph and detected using a mass-selective detector.

In the static process for determining temperature-dependent emissions, an amount of sample of 1.0 g/10 ml jar volume was weighed into a headspace analysis jar and, before the measurement, adjusted to a temperature of 120° C. for 5 hours in the gas-tight sealed analysis jar. The samples in the temperature-controlled sample jar were analyzed with the aid of a headspace sampler over the capillary column of a gas chromatograph.

The results of these analyses are reported in the following TABLE 2.

TABLE 2

|  | Example | | | |
| --- | --- | --- | --- | --- |
|  | 7 | 8 | 9* | 10* |
| Fogging [mg] according to DIN 75201/B | 0.07 | 0.08 | 0.37 | 0.08 |
| Emissions [ppm]¹⁾ | | | | |
| FOG value | 32 | 32 | 105 | 85 |
| VOC value | 13 | 13 | 52 | 250 |
| Emissions [ppm]²⁾ | 5 | 5 | 19.5 | 11.5 |

*comparison example not according to the invention
¹⁾dynamic process for determining temperature-dependent emissions
²⁾static process for determining temperature-dependent emissions To determine film damage, the elongation at tear of the foam-backed PVC films was determined in accordance with DIN 53504. The initial value of the film used was 290%. The elongation at tear of a film stored for 500 hours at 120° C. was 280%. A film foam-backed according to Example 1 was stored for 500 hours at 120° C., and the foam was then peeled off the film. The film exhibited no change in color. The elongation at tear of the film so obtained was 270%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An activator which is the reaction product of
   A) a secondary amine or primary alcohol having at least one tertiary amino group,
   B) a polyisocyanate of the diphenylmethane series having a functionality of from 2.5 to 4.0, and
   C) an OH-functional reactive component capable of addition to isocyanate.

2. A process for the production of polyurethanes comprising reacting a polyisocyanate and an isocyanate-reactive material in the presence of the activator of claim 1.

3. A low-emission polyurethane produced by the process of claim 2.

4. A molding composed of a polyurethane and at least one other material in which the polyurethane is the polyurethane produced by the process of claim 2.

5. An activator which is the reaction product of
   A) a secondary amine having at least one tertiary amino group,
   B) a polyisocyanate of the diphenylmethane series having a functionality of from 2.5 to 4.0, and
   C) an OH-functional reactive component capable of addition to isocyanate.

6. An activator which is the reaction product of
   A) a secondary amine or primary alcohol having at least one tertiary amino group,
   B) a polyisocyanate of the diphenylmethane series having a functionality of from 2.5 to 4.0, and
   C) an OH-functional reactive component capable of addition to isocyanate having a number average molecular weight of from 62 to 750.

7. An activator which is the reaction product of
   A) a secondary amine or primary alcohol corresponding to the formula $X(CH_2)_n NR_1 R_2$ in which X represents $HO(CH_2)_p NR_3((CH_2)_{m-O-})$ or $R_4 NR_5((CH_2)_q-NH-)$ in which n, m, p, and q each represent an integer from 2 to 5, and R₁, R₂, R₃, R₄, and R₅ each represent a C₁–C₅-alkyl group,
   B) a polyisocyanate of the diphenylmethane series having a functionality of from 2.5 to 4.0, and
   C) an OH-functional reactive component capable of addition to isocyanate.

* * * * *